United States Patent Office 2,732,361
Patented Jan. 24, 1956

2,732,361

VULCANIZATION OF COPOLYMERS OF METHA-CRYLONITRILE AND ALKYL ACRYLATE WITH A MIXTURE OF SULFUR AND TRIETHYLENE TETRAMINE

Edward M. Filachione, Philadelphia, and Charles F. Woodward, Abington, Pa., and John E. Hansen, Wilmington, Del., assignors to the United States of America as represented by the Secretary of Agriculture No Drawing. Application April 24, 1953,
Serial No. 351,058

10 Claims. (Cl. 260—41)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to new copolymers of acrylic esters with methacrylonitrile, to the vulcanization of such copolymers and to the elastomers produced by such vulcanization.

An object of this invention is to provide new copolymers of methacrylonitrile and alkyl acrylates, methods for the vulcanization of such copolymers and new elastomers having improved resistance to the deteriorating influence of heat, oils, light and ozone.

In the copending application of John E. Hansen and Thomas J. Dietz entitled "Vulcanizable Copolymers of Alkyl Acrylates and Methacrylates with Acrylonitrile," filed March 14, 1951, Serial Number 215,621, it is disclosed that copolymers of acrylonitrile with alkyl acrylates may be vulcanized with sulfur and triethylene tetramine to yield synthetic elastomers having high resistance to heat and lubricating oils.

We have now discovered that elastomers having even greater heat and oil resistance can be obtained by copolymerizing methacrylonitrile with a lower alkyl acrylate and then vulcanizing the copolymers with sulfur and triethylene tetramine.

The alkyl acrylate may be any in which the alkyl group contains not more than 8 carbon atoms, although we prefer those having 2 to 4 carbon atoms. The percentage of methacrylonitrile may be any in the range of about 5 to 20 percent, the preferred composition being 5 to 15 percent methacrylonitrile with the remaining 85 to 95 percent being alkyl acrylate.

The copolymers of this invention may be prepared by any of the conventional procedures used for the polymerization and copolymerization of acrylic esters. In general, we prefer the free radical catalyzed aqueous emulsion technique.

The copolymers may be compounded with carbon black and then vulcanized by incorporation of sulfur and triethylene tetramine and heating in a press. These techniques are well known in the art and are fully described in the publication of Dietz and Hansen in Rubber Age, 68, 699 (1951), and of Filachione, Fitzpatrick, Rehberg, Woodward, Palm, and Hansen, Rubber Age, 72 631 (1953).

Example I.—Preparation of copolymers

One liter of water containing 5 g. of sodium lauryl sulfate was placed in a flask fitted with thermometer, stirrer and reflux condenser. To this was added 394 g. of butyl acrylate and 19.7 g. of methacrylonitrile. The mixture was heated to 70° C., with stirring, at which 0.04 g. of potassium persulfate dissolved in a little water was added. Heating was continued until reflux began (94°), when another 0.04 g. portion of catalyst was added. Gentle reflux was maintained and three additional equal portions of catalyst were added at 15 minute intervals. When the temperature reached 98° (1.5 hr.) live steam was blown through the emulsion to remove remaining traces of monomer, after which the emulsion was slowly poured with stirring into 3 liters of 0.5 percent aluminum sulfate solution. The polymer thus coagulated was washed and dried, the yield being 395 g. Analysis showed the nitrogen content to be 1.05 percent (theoretical, 1.04%).

The same procedure was used with other monomers and monomer ratios.

Example II.—Compounding, curing and evaluation of copolymers

Standard ASTM procedures were used. The copolymers were masterbatched with a semi-reinforcing furnace black and stearic acid, and the vulcanizing agents were added on a standard two-roll mill.

The compositions for which data are shown in Table I, below, all contained 50 parts of black, 1 part of stearic acid, and 1 part of sulfur per 100 parts of copolymer and were cured for 1 hour at 298° F., after which they were heat-aged in air at 350° F. for 72 hours.

TABLE I.—PROPERTIES OF BUTYL ACRYLATE-METHACRYLONITRILE ELASTOMERS

| Methacrylonitrile content, percent | Triethylene Tetramine, Percent | Tensile strength, p. s. i. | | Ultimate Elongation, Percent | | Modulus at 200% along., p. s. i. | | Hardness [a] | | Brittle pt., ° F. | |
|---|---|---|---|---|---|---|---|---|---|---|---|
| | | A [b] | B [c] | A | B | A | B | A | B | A | B |
| 5 | 1.5 | 730 | 690 | 490 | 360 | 210 | 30 | 32 | 37 | −36 | −36 |
| 5 | 2.0 | 760 | 670 | 480 | 300 | 230 | 70 | 36 | 44 | −34 | −31 |
| 5 | 2.5 | 830 | 750 | 270 | 170 | 580 | 370 | 41 | 59 | | |
| 15 | 1.0 | 450 | 530 | 600 | 300 | 340 | 380 | 45 | 62 | −9 | −6 |
| 15 | 1.5 | 580 | 590 | 340 | 160 | 510 | 500 | 60 | 82 | −2 | −2 |
| 15 | 2.0 | 700 | 670 | 270 | 130 | 620 | 610 | 68 | 87 | | |
| 15 | 2.5 | 720 | 750 | 180 | 100 | | 750 | 81 | 94 | | |

[a] Shore durometer—A.
[b] Data in columns headed "A" are for cured but unaged specimens.
[c] Data in columns headed "B" are for cured and aged specimens.

From the data in Table I it is seen that exposure to 350° F. does not significantly affect the tensile strength or the brittle point of our elastomers, while the hardness is increased and the elongation is decreased. The modulus is substantially unaffected provided the sample is tightly vulcanized or the content of methacrylonitrile is over 5 percent.

In addition to outstanding heat resistance, our elastomers are extremely resistant to oils, greases, sunlight, air and ozone. No other available elastomeric material except the very expensive silicones possess such a combination of valuable properties.

Similar elastomers are obtained by copolymerizing methacrylonitrile with other lower alkyl acrylates, particularly with ethyl and propyl acrylates. Just as in the series of copolymers of acrylonitrile and lower alkyl acrylates described by Filachione et al., and by Dietz and Hansen, the lowest alkyl acrylates yield copolymers having high tensile strength, oil and heat resistance and brittle points, while the higher alkyl acrylates up to about the octyl ester yield elastomers having lower tensile strength, oil and heat resistance, and brittle points but higher water resistance. Thus, by choosing the optimum acrylic ester and percentage methacrylonitrile, elastomers having most suitable properties for any particular application are obtained. These elastomers are particularly useful for oil seals, gaskets, packing glands, hose, and other applications involving exposure to oils, greases, steam or high temperatures.

In the vulcanization of our copolymers at least about 0.5 percent of sulfur must be used, while more than about 1.0 percent has little effect on the product. The amount of triethylene tetramine is more critical. Less than about 1.0 percent does not produce a satisfactory cure while more than about 3.0 percent usually yields a vulcanizate that is undesirably hard and has low elongation and high brittle point.

The compounded polymers may be cured at any temperature in the range of 250 to 350° F., the time required being dependent on the temperature. Pressure is not required but is commonly used where the finished object is to be shaped in a mold and cured while in that shape. Higher tensile strengths may be obtained by the use of a strongly reinforcing carbon black.

We claim:

1. A vulcanizable elastomer comprising a copolymer of 5 to 15 percent of methacrylonitrile and 95 to 85 percent of an alkyl acrylate in which the alkyl group contains not more than 8 carbon atoms, and as a vulcanizing agent therefor, sulfur in an amount of 0.5 to 2.0 percent and triethylene tetramine in an amount of 1 to 3 percent of the copolymer used.

2. An elastomer as in claim 1 wherein the alkyl acrylate is butyl acrylate.

3. An elastomer as in claim 1 wherein the alkyl acrylate is ethyl acrylate.

4. A vulcanized elastomer consisting essentially of a vulcanized mixture of a copolymer of 5 to 15 percent of methacrylonitrile with 95 to 85 percent of an alkyl acrylate in which the alkyl group contains not more than 8 carbon atoms, carbon black as a reinforcing agent for said copolymer, and from 0.5 to 2.0 percent of sulfur and 1 to 3 percent of triethylene tetramine, the latter percentages being based on the said copolymer, as the vulcanizing agent for the said copolymer.

5. An elastomer as in claim 4 wherein the alkyl acrylate is butyl acrylate.

6. An elastomer as in claim 4 wherein the alkyl acrylate is ethyl acrylate.

7. A vulcanizable copolymer containing 5 to 15 percent of methacrylonitrile and 95 to 85 percent of an alkyl acrylate in which the alkyl group contains not more than 8 carbon atoms.

8. A copolymer as in claim 7 wherein the alkyl acrylate is butyl acrylate.

9. A copolymer as in claim 7 wherein the alkyl acrylate is ethyl acrylate.

10. The process of manufacturing a heat-resistant elastomer which comprises copolymerizing a mixture of 5 to 15 percent of methacrylonitrile and 85 to 95 percent of an alkyl acrylate in which the alkyl group contains not more than 8 carbon atoms, compounding the resulting copolymer with carbon black, sulfur and triethylene tetramine, and vulcanizing the compounded copolymer by application of heat.

References Cited in the file of this patent

Dietz et al.: Rubber Age, March 1951, pages 699, 700 and 706.

Filachione et al.: Rubber Age, February 1953, pages 631–637.